United States Patent

Seki et al.

[11] Patent Number: 5,113,835
[45] Date of Patent: May 19, 1992

[54] METHOD OF CONTROLLING EXHAUST GAS RECIRCULATION FOR AN INTERNAL COMBUSTION ENGINE

[75] Inventors: Yasunari Seki; Shigeto Kashiwabara; Takahiko Kaga, all of Wako, Japan

[73] Assignee: Honda Giken Kogyo K.K. (Honda Motor Co., Ltd. in English), Tokyo, Japan

[21] Appl. No.: 737,306

[22] Filed: Jul. 29, 1991

[30] Foreign Application Priority Data

Aug. 21, 1990 [JP] Japan .................. 2-220842

[51] Int. Cl.⁵ ............................................ F02M 25/07
[52] U.S. Cl. .................................................... 123/571
[58] Field of Search ..................... 123/568, 569, 571

[56] References Cited

U.S. PATENT DOCUMENTS

| | | | |
|---|---|---|---|
| 4,375,800 | 3/1983 | Otsuka et al. | 123/571 |
| 4,378,776 | 4/1983 | Nishimori | 123/571 |
| 4,378,777 | 4/1983 | Iida et al. | 123/571 |
| 4,665,882 | 5/1987 | Otobe | 123/571 |
| 4,823,798 | 4/1989 | Ichikawa | 123/571 |
| 4,848,303 | 7/1989 | Fujimoto et al. | 123/571 |

FOREIGN PATENT DOCUMENTS

| | | |
|---|---|---|
| 0123345 | 9/1980 | Japan . |
| 0011665 | 1/1985 | Japan . |
| 0081567 | 4/1986 | Japan . |
| 0009103 | 1/1988 | Japan . |

Primary Examiner—Willis R. Wolfe
Attorney, Agent, or Firm—Arthur L. Lessler

[57] ABSTRACT

A method of controlling exhaust gas recirculation for an internal combustion engine having an exhaust gas recirculation control system comprises the step of determining that there is failure in the exhaust gas recirculation control system when a difference between an actual value of valve opening of an exhaust gas recirculation valve of the system arranged in an exhaust gas recirculation passage for controlling an amount of exhaust gases returned from an exhaust passage to an intake passage of the engine and a desired value of the valve opening of the exhaust gas recirculation valve is equal to or larger than a predetermined value which is dependent on operating conditions of the engine.

3 Claims, 6 Drawing Sheets

METHOD OF CONTROLLING EXHAUST GAS RECIRCULATION FOR AN INTERNAL COMBUSTION ENGINE

BACKGROUND OF THE INVENTION

This invention relates to a method of controlling exhaust gas recirculation for an internal combustion engine, and more particularly to a method of this kind including detecting failure in an exhaust gas recirculation system of the engine.

Conventionally, there have been proposed the following manners of detecting failure in an exhaust gas recirculation system:

1) According to Japanese Provisional Patent Publication (Kokai) No. 55-123345, it is determined that there is failure in the exhaust gas recirculation system when the difference between a desired value of opening of a control valve which controls an amount of exhaust gas recirculation and an actually detected value of same has become larger than a predetermined value.

(2) According to Japanese Provisional Patent Publication (Kokai) No. 60-11665 and Japanese Patent Publication (Kokoku) No. 63-9103, it is determined that there is failure in the system when the above difference has continued to be larger than the predetermined value over a predetermined time period or longer.

(3) According to Japanese Provisional Patent Publication (Kokai) No. 61-81567, it is determined that there is failure in the system when the relationship in magnitude between a desired value of opening of the control valve and an actually detected value of same has remained uninverted over a predetermined time period or longer.

In general, when the engine is accelerating or decelerating, the desired value of opening of the control valve is largely changed, and there is a time lag in the following-up of the actual value of same, which results in an increased difference between the desired value of opening and the actually detected value of same. Therefore, according to the above manners (1) and (2), there can be a case in which the difference goes beyond the above-mentioned predetermined value when the engine is accelerating or decelerating, and hence failure in the system is erroneously detected. If the predetermined value is set to a larger value in order to prevent such an erroneous detection of failure, there arises an inconvenience that failure cannot be detected except when the control valve continues to be fully opened or closed.

Further, according to the above manner (3), if the desired value and the actually detected value are nearly equal to each other and stable, and hence the relationship in magnitude between the two values remains uninverted for a long time period, when the engine is in a steady operating condition, it is erroneously determined that there is failure in the exhaust gas recirculation system although actually the system is normally functioning.

SUMMARY OF THE INVENTION

It is the object of the invention to provide a method of controlling exhaust gas recirculation for an internal combustion engine, which is capable of accurately detecting failure in an exhaust gas recirculation system when the engine is in a transient operating condition as well as when it is in a steady operating condition.

To attain the above object, the present invention provides a method of controlling exhaust gas recirculation for an internal combustion engine including an intake passage, an exhaust passage, and an exhaust gas recirculation control system having an exhaust gas recirculation passage connecting the exhaust passage with the intake passage, an exhaust gas recirculation valve arranged in the exhaust gas recirculation passage for controlling an amount of exhaust gases returned from the exhaust passage to the intake passage, and valve-operating means for varying valve opening of the exhaust gas recirculation valve, the method including the steps of:
 detecting an actual value of the valve opening of the exhaust gas recirculation valve;
 detecting operating conditions of the engine;
 setting a desired value of the valve opening of the exhaust gas recirculation valve in accordance with a detected operating condition of the engine;
 calculating a difference between the actual value and the desired value of the valve opening; and
 controlling the valve-operating means such that the difference is reduced to zero.

The method according to the invention is characterized by comprising the step of determining that there is failure in the exhaust gas recirculation control system when the difference between the actual value and the desired value of the valve opening is equal to or larger than a predetermined value which is dependent on operating conditions of the engine.

Preferably, the predetermined value is set to to a larger value when the engine is in a transient operating condition than when it is in a steady operating condition.

More preferably, it is finally determined that there is failure in the exhaust gas recirculation control system, when the difference between the actual value and the desired value of the valve opening has continuously been equal to or larger than the predetermined value over a predetermined time period.

The above and other objects, features, and advantages of the invention will become more apparent from the ensuing detailed description taken in conjunction with the accompanying drawings.

DETAILED DESCRIPTION

The invention will now be described in detail with reference to the drawings showing an embodiment thereof.

Figure 1:
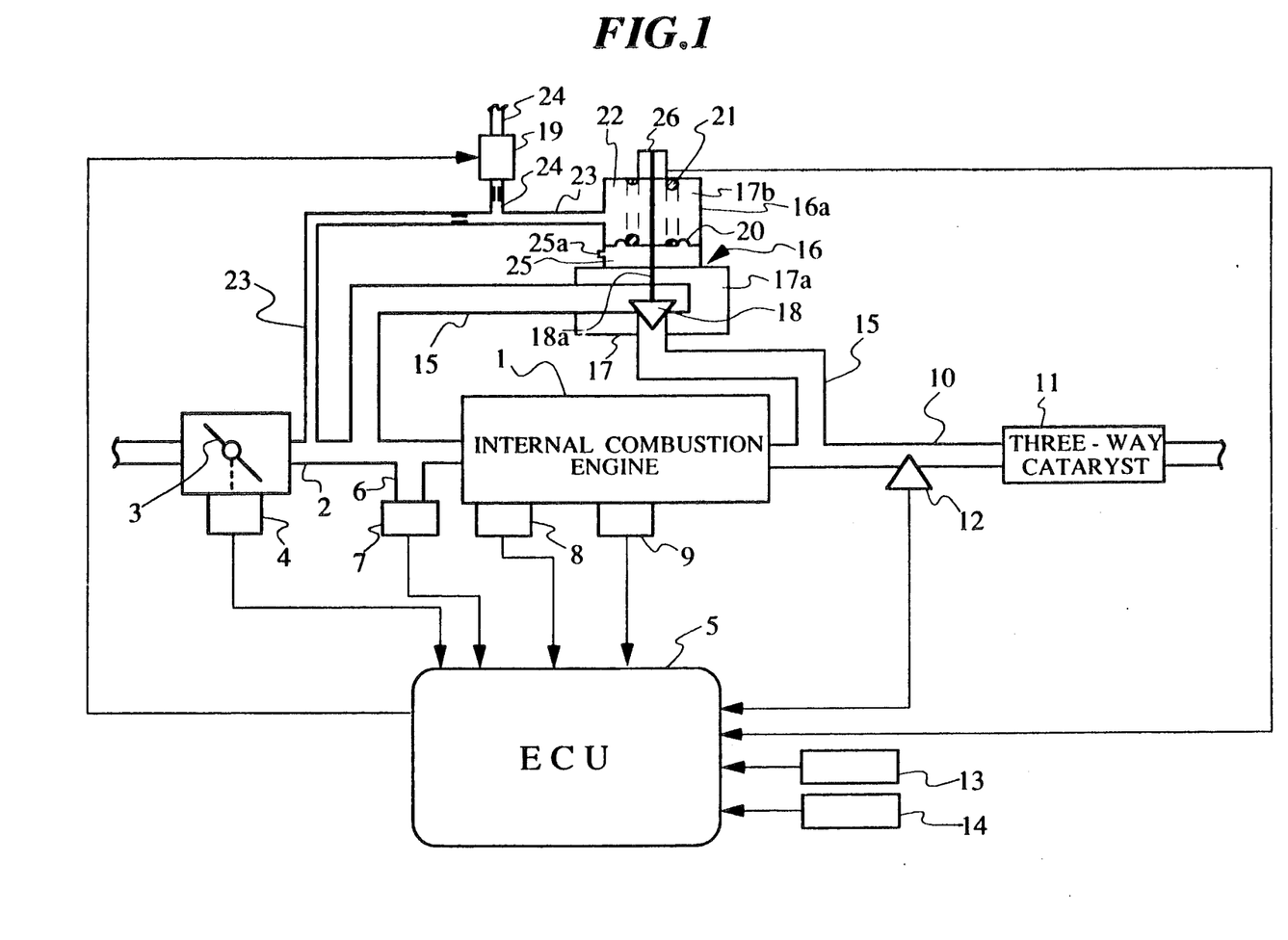
FIG. 1 is a schematic diagram showing the whole arrangement of an exhaust gas recirculation control system to which is applied the method according to an embodiment of the invention.

FIG. 1 shows the whole arrangement of an exhaust gas recirculation control system for an internal combustion engine, to which is applied the method according to an embodiment of the invention. In the figure, reference numeral 1 designates an internal combustion engine (e.g. four-cylinder type) for automotive vehicles. Connected to the cylinder block of the engine 1 is an intake pipe (intake passage) 2 in which is arranged a throttle valve 3. A throttle valve opening sensor (hereinafter referred to as "the $\theta_{TH}$ sensor") 4 is connected to the throttle valve 3 for generating an electric signal indicative of the sensed throttle valve opening and supplying same to an electronic control unit (hereinafter referred to as "the ECU") 5.

On the other hand, an intake pipe absolute pressure ($P_{BA}$) sensor (hereinafter referred to as "the $P_{BA}$ sensor") 7 is provided in communication with the interior of the intake pipe through a conduit 6 at a location downstream Of the throttle valve for supplying an electric signal indicative of the sensed absolute pressure within the intake pipe 2 to the ECU 5.

An engine coolant temperature sensor (hereinafter referred to as "the $T_W$ sensor") 8, which may be formed of a thermistor or the like, is inserted into a jacket for coolant in the cylinder block of the engine and fixed thereto, for supplying an electric signal indicative of the sensed engine coolant temperature to the ECU 5.

An engine rotational speed sensor (hereinafter referred to as "the Ne sensor") 9 is arranged in facing relationship to a camshaft or a crankshaft of the engine 1, neither of which is shown. The engine rotational speed sensor 9 generates a pulse as a TDC signal pulse at each of predetermined crank angles whenever the crankshaft rotates through 180 degrees, the pulse being supplied to the ECU 5.

A catalytic converter (three-way catalyst) 11 is arranged in an exhaust pipe (exhaust passage) 10 connected to an exhaust port of said engine 1, for purifying noxious components such as HC (hydrocarbon), CO (carbon monoxide), and NOx (nitrogen oxides).

An oxygen concentration sensor (hereinafter referred to as "the $O_2$ sensor") 12 is mounted in the exhaust pipe 10 at a location upstream of the catalytic converter 11, for sensing the concentration of oxygen present in exhaust gases emitted from the engine and supplying an electric signal indicative of the sensed oxygen concentration to the ECU 5.

Also connected to the ECU 5 are an atmospheric pressure sensor (hereinafter referred to as "the $P_A$ sensor" 13 for detecting atmospheric pressure, and supplying an electric signal indicative of the sensed atmospheric pressure to the ECU 5, and an electrode of a battery 14, output voltage thereof being supplied to same.

An exhaust gas recirculation passage 15 is arranged between the intake pipe 2 and the exhaust pipe 10 such that it bypasses the engine 1. The exhaust gas recirculation passage has one end thereof connected to the interior of the exhaust pipe 10 at a location upstream of the $O_2$ sensor 12 (i.e. on the engine side of same), and the other end thereof connected to the interior of the intake pipe 2 at a location upstream of the $P_{BA}$ sensor 7 (i.e. on the throttle valve side of same).

An exhaust gas recirculation control valve (hereinafter referred to as "the EGR valve") 16 is arranged across an intermediate portion of the exhaust gas recirculation passage 15. The EGR valve is formed of a so-called diaphragm valve operated by valve operating means 16a of differential pressure-responsive type. The EGR valve comprises a casing 17 having a valve chamber 17a and a diaphragm chamber 17b defined therein, a valve body 18 arranged within the valve chamber 17a of the casing 17 for movement to close and open the exhaust gas recirculation passage 15, a diaphragm (member responsive to differential pressure) 20 connected to the valve body 18 via a valve stem 18a and operated in accordance with resultant pressure of the pressure $P_{BA}$ within the intake pipe and atmospheric pressure $P_1$, which resultant pressure is controlled by a resultant pressure control valve 19 described in detail hereinbelow, and a spring 21 urging the diaphragm 20 in a valve-closing direction. A negative pressure communication passage 23 has one end thereof connected to a negative pressure chamber 22 defined by the diaphragm 20 on an upper side thereof as viewed in FIG. 1, and the other end thereof connected to the interior of the intake pipe 2 at a location between the throttle valve and the other end of the exhaust gas recirculation passage 15, whereby the pressure $P_{BA}$ within the intake pipe 2 is supplied to the negative pressure chamber 22 via the negative pressure communication passage 23. An atmosphere communication passage 24 is connected to an intermediate portion of the negative pressure communication passage 23, and the resultant pressure control valve 19 is arranged across the atmosphere communication passage 24. The operation of the resultant pressure control valve 19, which is formed of a normally-open electromagnetic valve, is controlled by a duty ratio of a command signal from the ECU 5 to thereby control the resultant pressure introduced into the negative pressure chamber 22 of the diaphragm chamber 17. The resultant pressure control valve 19 is electrically connected to the ECU 5, to be controlled by the command signal from the ECU 5, whereby the lift amount or lifting speed of the valve body 18 of the EGR valve 16 is controlled. An atmospheric pressure chamber 25 is defined by the diaphragm 20 on a lower side thereof and communicates with the atmosphere via a hole 25a.

A valve opening (lift) sensor (hereinafter referred to as "the L sensor") 26 is provided for the EGR valve 16, which detects an operating position (lift amount) of the valve body 18 of the EGR valve 16 and supplies a signal indicative of the detected lift amount of the valve body 18. The ECU 5 determines whether or not the signal from the L sensor has a normal value or not, and on the other hand determines operating conditions of the engine 1 based on the signals supplied from the $\theta$TH sensor 4, $P_{BA}$ sensor 7, $T_W$ sensor 8, Ne sensor 9, $O_2$ sensor 12, and $P_A$ sensor 13. It calculates a desired value $L_{CMD}$ of valve opening of the EGR valve 16 based on the above determination.

The desired value $L_{CMD}$ of valve opening of the EGR valve 16 can be calculated in various manners. For example, a desired value $L_{CMD}$ is selected from a plurality of groups of desired values stored in advance in accordance with operating conditions of the engine, in accordance with the engine rotational speed and the intake pipe absolute pressure $P_{BA}$.

The thus selected desired value $L_{CMD}$ of valve opening of the EGR valve 16 is compared with an actual value $L_{ACT}$ of valve opening of the EGR valve 16 detected by the L sensor 26. The resultant pressure control valve 19 is operated to control the lift of the EGR valve 16 such that the difference between the desired value $L_{CMD}$ and the actual valve $L_{ACT}$ is reduced to zero, whereby the valve opening of the EGR valve 16 is controlled in accordance with operating conditions of the engine 1 to recirculate the optimum flow rate of exhaust gases.

If the resultant pressure control valve 19 is energized to be closed, the negative pressure within the negative pressure chamber 22 increases, i.e. The force biasing the diaphragm 20 in a valve-opening direction (i.e. upward) increases, so that the diaphragm 20 moves upward against the urging force of the spring 21 to thereby increase the valve opening defined by the valve body 18 of the EGR valve 16. On the other hand, if the control valve 19 is deenergized to be opened, the negative pressure within the negative pressure chamber 22 decreases, i.e. The force biasing the diaphragm 20 in the valve-opening direction decreases, so that the diaphragm 20 moves downward by the urging force of the spring 21 to thereby displace the valve body 18 of the EGR valve 16 to a lower position to decrease the valve opening defined by the valve body 18. In this way, the valve opening of the EGR valve 16 can be controlled by energizing or deenergizing the resultant pressure control valve 19.

Figure 2A:
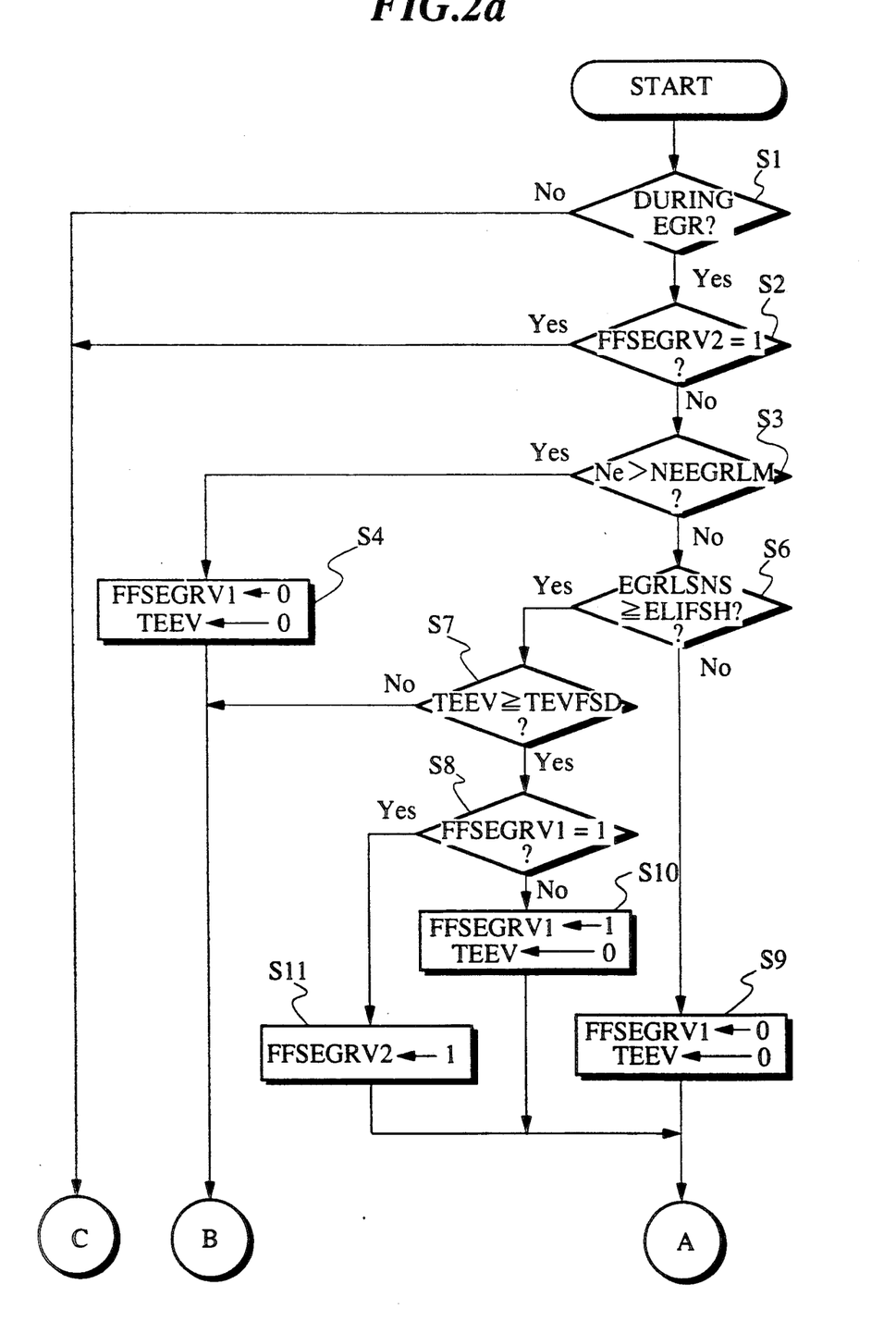
FIGS. 2a and 2b are a flowchart of a program for carrying out detection of failure in the exhaust gas recirculation control system.
Figure 2B:
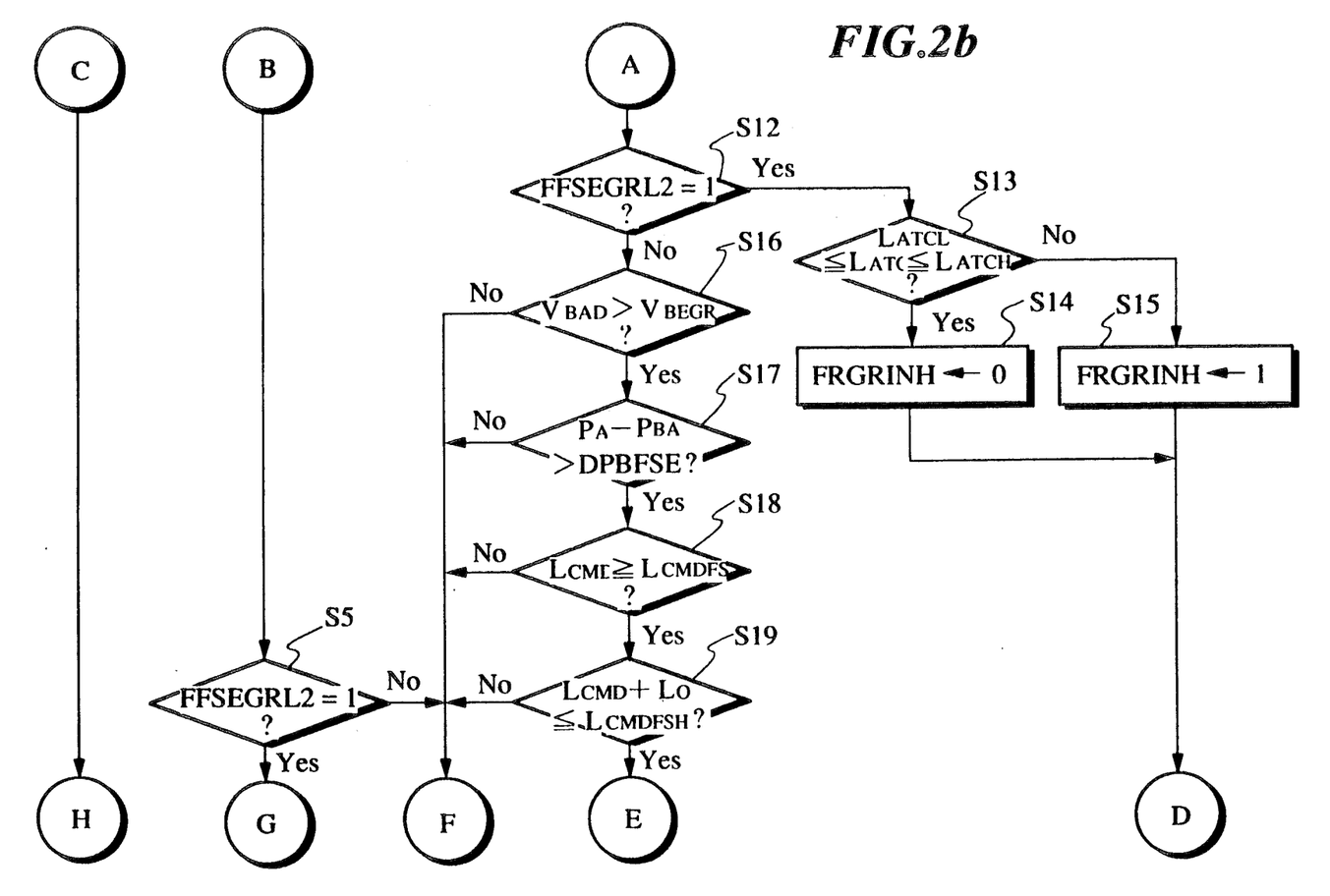
Figure 2C:
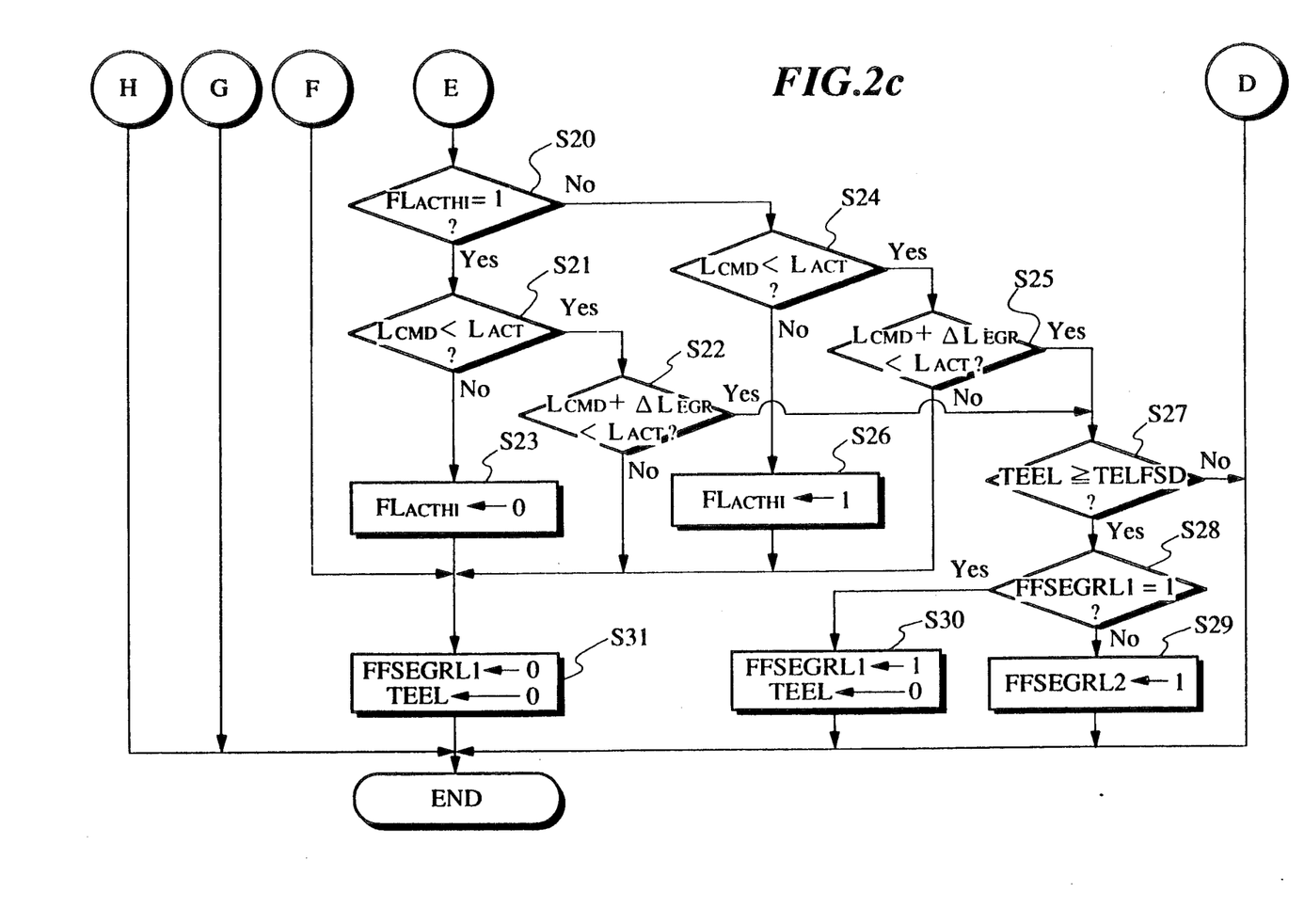

FIG. 2 shows a program for carrying out detection of failure in the exhaust gas recirculation control system (hereinafter referred to as "the EGR control system") comprising the L sensor 26, EGR valve 16, control vale 19, exhaust gas recirculation passage 15, etc. The program is carried out whenever a predetermined time period (e.g. 40 milliseconds) elapses.

At a step $S_1$, it is determined whether or not the exhaust gas recirculation is being carried out. If the answer is negative (No), the present program is immediately terminated. If the answer to this question is affirmative (Yes), it is determined at a step S2 whether or not a second sensor abnormality detection flag FFSEGRV2 (hereinafter simply referred to as "FFSEGRV2"), which is set to 1, as described hereinbelow, when abnormality Of the output voltage of the L sensor 26 has been detected twice, is equal to 1. If the answer to this question is affirmative (Yes), i.e. if FFSEGRV2=1, the present program is immediately terminated. If the answer to this question is negative (No), i.e. if FFSEGRV2=0, it is determined at a step S3 whether or not the engine rotational speed Ne is higher than a predetermined value NEEGRLM (e.g. 5,500 rpm). If the answer to this question is affirmative (Yes), i.e. if Ne > NEEGRLM, a first sensor abnormality detection flag FFSEGRV (hereinafter simply referred to as "FFSEGRV1"), which is set to 1, as described hereinbelow, when abnormality of output voltage of the L sensor 16 has been detected for the first time, is set to 0, and at the same time, a timer (hereinafter referred to as "the first timer" TEEV for detection of abnormality of the output voltage of the L sensor 16 is set to 0, at a step S4. Then, at a step S5, it is determined whether or not a second valve-piping abnormality detection flag FFSEGRL2 (hereinafter simply referred to as "FFSEGRL2") which is set to 1 when abnormality (hereinafter simply referred to as "valve-piping abnormality") of valves and piping such as the EGR valve 16 and the exhaust gas recirculation passage 15, has been detected twice, is equal to 1. If the answer to this question is affirmative (Yes), the present program is immediately terminated, whereas if the answer is negative (No), a first valve-piping abnormality detection flag FFSEGRL1 (hereinafter simply referred to as "FFSEGRL1"), which is set to 1 when valve-piping abnormality has been detected for the first time, is set to 0, and at the same time, the count value of a timer (hereinafter referred to as "the second timer") TEEL for detection of valve-piping abnormality is set to 0, at a step S31, followed by terminating the present program.

If the answer to the question of the step S3 is negative (No), i.e. if Ne≦NEEGRLM, it is determined at a step S6 whether Or not the output voltage EGRLSNS Of the L sensor 26 is equal to or higher than an upper limit value ELIFSH. If the answer to this question is negative (No), i.e. if EGRLSNS<ELIFSH, FFSEGRV1 is set to 0, and at the same time the count value of the first timer TEEV is set to 0, at a step S9, followed by the program proceeding to a step S12.

If the answer to the question of the step S6 is affirmative (Yes), i.e. if EGRLSNS≧ELIFSH, it is determined at a step S7 whether or not the count value of the first timer TEEV is equal to or larger than a first predetermined time period TEVFSD. If the answer to this question is negative (No), the program proceeds to the step S5, whereas if the answer is affirmative (Yes), it is determined at a step S8 whether or not FFSEGRV1 is equal to 1. If the answer to this question is negative (No), i.e. if FFSEGRV1= 0, FFSEGRV1 is set to 1, and at the same time the count value of the first timer TEEV is set to 0 at a step S10. If the answer to the question of the step S8 is affirmative (Yes), i.e. if FFSEGRV1=1, which means that the present loop is one after the first detection to abnormality of the output voltage of the L sensor 26, FFSEGRV2 is set to 1 at a step S11, and the program proceeds to the step S12.

Thus, according to the steps S6 to S11, when the output voltage EGRLSNS of the L sensor has continuously been equal to or higher than the upper limit value ELISFSH over the first predetermined time period TEVFSD, the first sensor abnormality detection flag FFSEGRV1 is set to 1 and further when the state of FFSEGRV1=1 has continued over the first predetermined time period TEVFSD, the second sensor abnormality detection flag FFSEGRV2 is set to 1.

At the step S12, it is determined whether or not the second valve-piping abnormality flag FFSEGRL2 is equal to 1. If the answer to this question is negative (No), it is determined at a step S16 whether or not the battery voltage $V_{BAD}$ is higher than a predetermined value $V_{BEGR}$. If the answer to this question is affirmative (Yes)., it is determined at a step S17 whether or not a value ($P_A - P_{BA}$) obtained by subtracting the intake pipe absolute pressure $P_{BA}$ from the atmospheric pressure $P_A$ is higher than a predetermined value DPBFSE. If the answer to this question is affirmative (Yes), it is determined at a step S18 whether or not the desired value $L_{CMD}$ of valve opening of the EGR valve 16 is equal to or larger than a predetermined lower limit value $L_{CMDFS}$. If the answer to this question is affirmative (Yes), it is determined at a step S19 whether or not the sum of the desired value $L_{CMD}$ and a zero point correction value $L_O$ is equal to or lower than a predetermined upper limit value $L_{CMDFSH}$. If any of the answers to these questions of the steps S16 to S19 is negative (No), the program proceeds to the step S31, whereas if all the answers are affirmative (Yes), i.e. if $V_{BAD}>V_{BEGR}$, $(P_A - P_{BA})>$DPBFSE, $L_{CMD}≧L_{CMDFS}$, and $(L_{CMD} + L_O)≦$LCMDFSH, the program proceeds to a step S20, where it is determined whether or not a flag $FL_{ACTHI}$ (hereinafter simply referred to as "$F_{LACTHI}$"), which is set to 1 when the actual value $L_{ACT}$ of valve opening of the EGR valve is equal to or larger than the desired value $L_{CMD}$, is equal to 1. If the answer to this question is affirmative (Yes), i.e. $FL_{ACTHI}= 1$, which means that the condition of $L_{CMD}<L_{ACT}$ was satisfied in the last loop, it is determined at a step S21 whether or not a condition of $L_{CMD} < L_{ACT}$ is satisfied in the present loop. If the answer to this question is negative (No), i.e. if $L_{CMD} \geq L_{ACT}$, $F_{LACTHI}$ is set to 0 at a step S23, followed by the program proceeding to the step S31.

If the answer to the question of the step S21 is affirmative (Yes), i.e. if the condition of $L_{CMD} < L_{ACT}$ is also satisfied in the present loop, it is determined at a step S22 whether or not a value ($L_{CMD} + \Delta L_{EGR}$) obtained by adding an allowance value $\Delta L_{EGR}$ to the desired value $L_{CMD}$ is smaller than the actual value $L_{ACT}$ of valve opening of the EGR valve.

Figure 3:
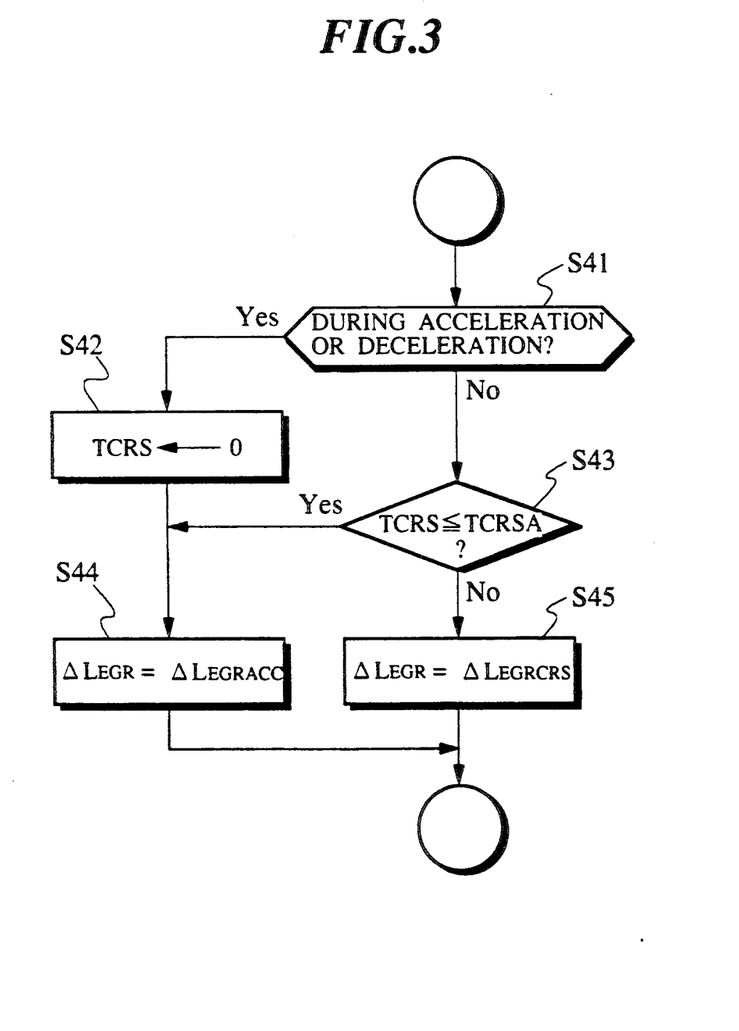
FIG. 3 is a flowchart of a subroutine for setting an allowance value $\Delta L_{EGR}$ for failure detection, which is used in the program of FIG. 2.

Here, the allowance value $\Delta L_{EGR}$ is set by a subroutine shown in FIG. 3.

In the figure, at a step S41, it is determined whether or not the engine is accelerating or decelerating. This determination is carried out by determining whether the absolute value of an amount of change $\Delta P_{BA}$ in the intake pipe absolute pressure $P_{BA}$ (the difference between a value of $P_{BA}$ detected in the immediately preceding loop and a value of same detected in the present loop) or the absolute value of an amount of change $\Delta \theta_{TH}$ in the throttle valve opening $\theta_{TH}$ exceeds a predetermined value. If the answer to the question of the step S41 is affirmative (Yes), i.e. if the engine is accelerating or decelerating, the count value of a cruisinge timer TCRS for measuring time elapsed after stoppage of acceleration or deceleration of the engine is set to 0 at a step S42, and the allowance value $\Delta L_{EGR}$ is set to a predetermined value $\Delta L_{EGRACC}$ for acceleration or deceleration of the engine at a step S44.

On the other hand, if the answer to the question of the step S41 is negative (No), i.e. if the engine is in a constant-speed or steady operating condition, it is determined at a step S43 whether or not the count value of the cruising timer TCRS is equal to or smaller than a predetermined time period TCRSA. If the answer to this question is affirmative (Yes), the program proceeds to the step S44, whereas if the answer is negative (No), the allowance value $\Delta L_{EGR}$ is set to a predetermined value $\Delta L_{EGRCRS}$ for constant-speed or steady operation of the engine which is smaller than the predetermined value $\Delta L_{EGRACC}$ for acceleration or deceleration of the engine at a step S45.

According to the subroutine of FIG. 3, the allowance value $\Delta L_{EGR}$ is set to a larger value during acceleration or deceleration of the engine and before the predetermined time period TCRSA elapses after transition from acceleration or deceleration to a constant-speed or steady operation of the engine, than after the predetermined time period TCRSA has elapsed after the transition.

Referring again to FIG. 2, if the answer to the question of the step S22 is negative (No), i.e. if $(L_{CMD} + \Delta L_{EGR}) \geq L_{ACT}$, it is judged that there is no failure occurring in the EGR control system since the actual value $L_{ACT}$ of valve opening of the EGR valve is within an allowable range, and then the program proceeds to the step S31. If the answer to the question of the step S22 is affirmative (Yes), i.e. if $(L_{CMD} + \Delta L_{EGR}) < L_{ACT}$, the program proceeds to a step S27 since the actual value $L_{ACT}$ is outside the allowable range. At the step S27, it is determined whether or not the count value of the second timer TEEL for detecting valve-piping abnormality is equal to or larger than a second predetermined time period TELFSD. If the answer to this question is negative (No), i.e. before the second predetermined time period elapses, the present program is immediately terminated, whereas if the answer is affirmative (Yes), it is determined at a step S28 whether or not FFSEGRL1 is equal to 1. If the answer to this question is negative (No), i.e. if FFSEGRL1=0, FFSEGRL1 is set to 1, and at the same time the count value of the second timer TEEL is set to 0, at a step S29, followed by terminating the present program. If the answer to the question of the step S28 is affirmative (Yes), i.e. if FFSEGRLI=1, FFSEGRL2 is set to 1 at a step S30, followed by terminating the present program.

If the answer to the question of the step S20 is negative (No), i.e. if FLACTHI=0, which means the the condition of $L_{CMD} \geq L_{ACT}$ was satisfied in the immediately preceding loop, it is determined at a step S24 whether or not a condition of $L_{CMD} > L_{ACT}$ also satisfied in the present loop. If the answer to this question is negative (No), i.e. if $L_{CMD} \leq L_{ACT}$, $F_{LACTHI}$ is set to 1 at a step S26, and then the program proceeds to the step S31. If the answer to the question of the step S24 is affirmative (Yes), i.e. if the condition of $L_{CMD} > L_{ACT}$ is also satisfied in the present loop, it is determined at a step S25 whether or not a value ($L_{CMD} - \Delta L_{EGR}$) obtained by subtracting the allowance value $\Delta L_{EGR}$ from the desired value $L_{CMD}$ of valve opening of the EGR valve is larger than the actual value $L_{ACT}$. If the answer to this question is negative (No), i.e. if $(L_{CMD} - \Delta L_{EGR}) \geq L_{ACT}$, it is judged that there is no failure occurring in the EGR control system since the actual value $L_{ACT}$ is in an allowable range, and the program proceeds to the step S31. If the answer to the question of the step S25 is affirmative (Yes), i.e. if $(L_{CMD} - \Delta L_{EGR}) > L_{ACT}$, the program proceeds to the step S27 since the actual value $L_{ACT}$ is outside the allowable range.

Thus, according to the steps S20 to S30, if the state of $L_{ACT} > (L_{CMD} + \Delta L_{EGR})$ or $L_{ACT} < (L_{CMD} - \Delta L_{EGR})$, which means that the actual value $L_{ACT}$ is outside the allowable range, has continued over the second predetermined time period TELFSD, first, FFSEGRL1 is set to 1, and then if this state has further continued over the second predetermined time period TELFSD, FFEGRL2 is set to 1.

If the answer to the question of the step S12 is affirmative (Yes), i.e. if FFEGRL2=1, it is determined at a step S13 whether or not the actual value $L_{ACT}$ falls between predetermined upper and lower limit values $L_{ACTH}$, $L_{ACTL}$. If the answer to this question is affirmative (Yes), i.e. if $L_{ACTL} \leq L_{ACT} \leq L_{ACTH}$, an EGR control-inhibiting flag FEGRINH is set to a value of 0 (which indicates that the EGR control is not inhibited) even if failure in the EGR control system has been detected. On the other hand, if the answer to the question of the step S13 is negative (No), i.e. if the actual value $L_{ACT}$ is outside the range defined by the upper and lower limit values, the EGR control-inhibiting flag FEGRINH is set to a value of 1 at a step S15 to thereby inhibit EGR control thereafter.

Figure 4:
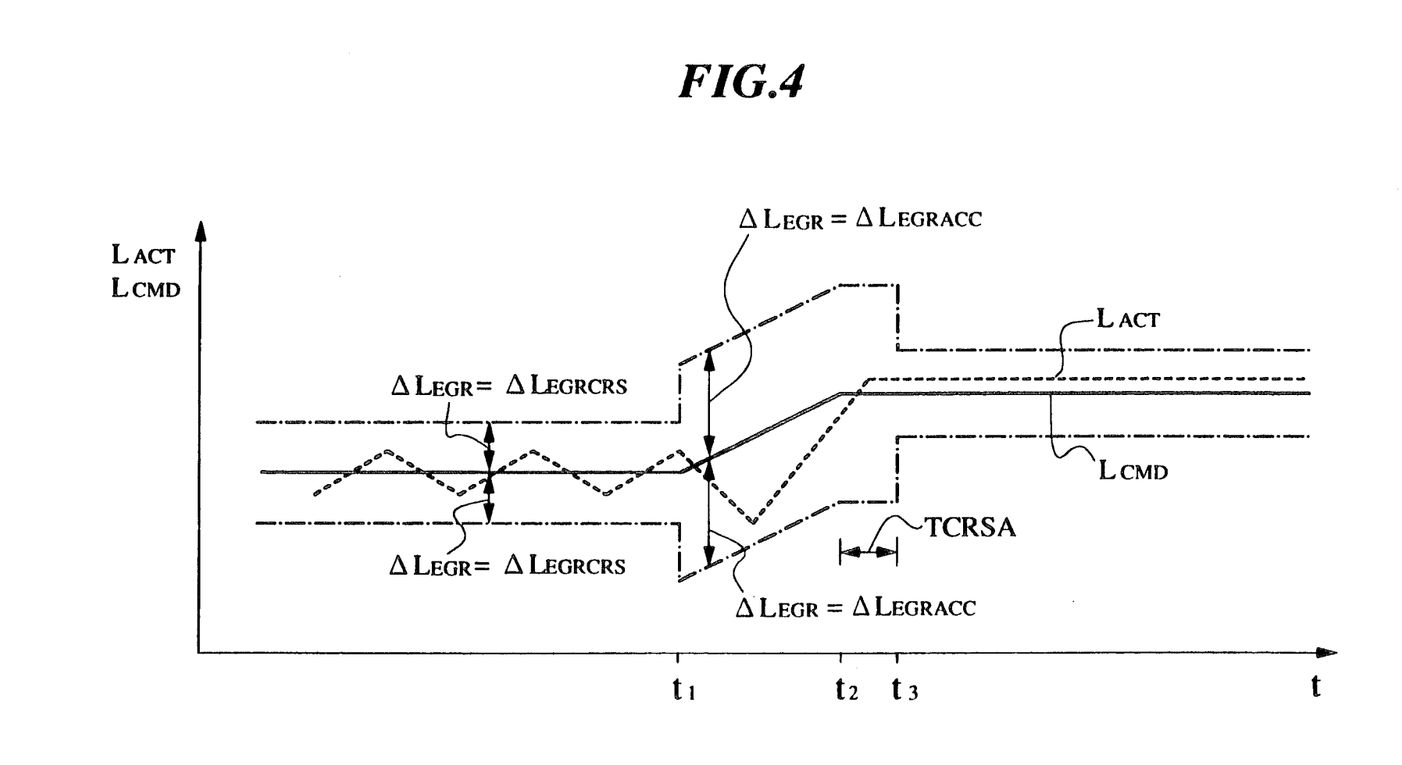
FIG. 4 is a diagram showing changes in the desired value and the actually detected value of opening of a control valve for controlling an amount of exhaust gas recirculation.

FIG. 4 shows an example of changes in the desired value $L_{CMD}$ and the actual value $L_{ACT}$. In the diagram, before a time point $t_1$ and after a time point $t_2$, the engine is in a constant-speed or steady operating condition, while between the time points $t_1$ and $t_2$, the engine is accelerating.

According to the subroutine shown in FIG. 3, when the engine is in a constant-speed or steady operating condition, the allowance value $\Delta L_{EGR}$ is set to the predetermined value $\Delta L_{EGRCRS}$ for constant-speed or steady operation of the engine, and when the engine is accelerating, it is set to the predetermined value $\Delta L_{EGRACC}$ for acceleration or deceleration which is larger than $\Delta L_{EGRCRS}$. Therefore, even if the actual value $L_{ACT}$ is delayed, as indicated by the broken line, in following up the desired value $L_{CMD}$ during acceleration, it does not go beyond an allowable range, which enables to prevent erroneous detection of failure in the EGR control system during acceleration. Further, as shown in part of the diagram after a time point $t_3$, even if a state in which the relationship in magnitude between the actual value $L_{ACT}$ and the desired value $L_{CMD}$ continues uninverted during constant-speed or steady operation of the engine, erroneous detection of failure in the EGR control system can be prevented.

What is claimed is:

1. In a method of controlling exhaust gas recirculation for an internal combustion engine including an intake passage, an exhaust passage, and an exhaust gas recirculation control system having an exhaust gas recirculation passage connecting said exhaust passage with said intake passage, an exhaust gas recirculation valve arranged in said exhaust gas recirculation passage for controlling an amount of exhaust gases returned from said exhaust passage to said intake passage, and valve-operating means for varying valve opening of said exhaust gas recirculation valve, said method including the steps of:

detecting an actual value of said valve opening of said exhaust gas recirculation valve;

detecting operating conditions of said engine;

setting a desired value of said valve opening of said exhaust gas recirculation valve in accordance with a detected operating condition of said engine;

calculating a difference between said actual value and said desired value of said valve opening; and controlling said valve-operating means such that said difference is reduced to zero;

the improvement comprising the step of determining that there is failure in said exhaust gas recirculation control system when said difference between said actual value and said desired value of said valve opening is equal to or larger than a predetermined value which is dependent on operating conditions of said engine.

2. A method of controlling exhaust gas recirculation according to claim 1, wherein said predetermined value is set to to a larger value when said engine is in a transient operating condition than when it is in a steady operating condition.

3. A method of controlling exhaust gas recirculation according to claim 2, wherein it is finally determined that there is failure in said exhaust gas recirculation control system, when said difference between said actual value and said desired value of said valve opening has continuously been equal to or larger than said predetermined value over a predetermined time period.

* * * * *